(12) United States Patent
Kahrger et al.

(10) Patent No.: US 11,697,557 B2
(45) Date of Patent: Jul. 11, 2023

(54) RUNNING TRACK AND CARRIER FOR DIAGNOSTIC SYSTEM OF CARRIER ROLLERS ON CONVEYORS

(71) Applicant: TAKRAF GmbH, Leipzig (DE)

(72) Inventors: Rainer Kahrger, Leipzig (DE); Jan Nowak, Leipzig (DE); Boris Freier, Leipzig (DE); Mario Dilefeld, Leipzig (DE)

(73) Assignee: TAKRAF GmbH, Leipzig (DE)

( * ) Notice: Subject to any disclaimer, the term of this patent is extended or adjusted under 35 U.S.C. 154(b) by 145 days.

(21) Appl. No.: 17/237,358

(22) Filed: Apr. 22, 2021

(65) Prior Publication Data

US 2021/0331872 A1 Oct. 28, 2021

(30) Foreign Application Priority Data

Apr. 23, 2020 (DE) ...................... 10 2020 111 077.4

(51) Int. Cl.
| | |
|---|---|
| *B65G 21/22* | (2006.01) |
| *B65G 39/18* | (2006.01) |
| *E01B 25/24* | (2006.01) |
| *B65G 43/02* | (2006.01) |

(52) U.S. Cl.
CPC ............. *B65G 39/18* (2013.01); *B65G 43/02* (2013.01); *B65G 2203/042* (2013.01)

(58) Field of Classification Search
CPC .......... B65G 21/22; B65G 39/18; E01B 25/24
USPC .................... 198/369.1, 861.1, 818, 828, 684
See application file for complete search history.

(56) References Cited

U.S. PATENT DOCUMENTS

| | | | | |
|---|---|---|---|---|
| 6,769,536 | B2* | 8/2004 | Lutz ...................... | B65G 35/06 198/465.1 |
| 6,935,490 | B2* | 8/2005 | Trieb ...................... | B65G 21/04 198/848 |
| 8,800,755 | B2* | 8/2014 | Sharp ..................... | B65G 39/16 198/840 |
| 8,967,367 | B2* | 3/2015 | Kasuya ............. | H01L 21/67259 198/465.4 |

(Continued)

FOREIGN PATENT DOCUMENTS

| | | |
|---|---|---|
| CN | 104898671 A | 9/2015 |
| CN | 206417548 U | 8/2017 |

(Continued)

*Primary Examiner* — Douglas A Hess
(74) *Attorney, Agent, or Firm* — Heslin Rothenberg Farley & Mesiti PC (57) ABSTRACT

The invention relates to idler diagnosis systems on conveyors, comprising a rail system as a track for suitable running gears and the running gear, the rail system being formed from a closed profile or tube. The rail system comprises a multi-part track holder arranged on the belt frame, a fixing rod and a running rail, the track holder being suitable for accommodating the running rail at at least one end by insertion, thus creating a track without cross-section differences. The running gear has at least one two-roller system as a guide and drive system, and at least one chassis that accommodates and connects the two roller systems and has connection options for sensor-system carriers and/or energy control module. The guide system encloses the track so only one movement (forwards/backwards) along the track is provided. The drive system moves the chassis and all the connected systems with respect to the track.

17 Claims, 10 Drawing Sheets

(56) References Cited

U.S. PATENT DOCUMENTS

| | | | | |
|---|---|---|---|---|
| 8,985,317 B2 * | 3/2015 | Martin | ................ | B65G 39/125 |
| | | | | 198/828 |
| 10,899,546 B2 * | 1/2021 | Munday | ................ | B65G 21/14 |
| 2022/0033190 A1 | 2/2022 | Baggio et al. | | |

FOREIGN PATENT DOCUMENTS

| | | |
|---|---|---|
| EP | 3543179 A1 | 7/2014 |
| EP | 2828183 B1 | 3/2019 |
| GB | 1045145 A | 10/1966 |

* cited by examiner

RUNNING TRACK AND CARRIER FOR DIAGNOSTIC SYSTEM OF CARRIER ROLLERS ON CONVEYORS

This application claims priority to German Patent Application No. 10 2020 111 077.4 filed on Apr. 23, 2020, the entire contents of which are hereby incorporated herein by reference.

The invention relates to idler diagnosis systems on conveyors, where these conveyors can be part of the supporting structure for new deliveries or retrofitting of existing systems, the focus being on a separate system on the conveyor, and suitability for rough everyday operation, as well as dismantling during maintenance work on the conveyor, being understood to be the basic object.

Conveyors, such as conveyor belts, conveyor lines, transport belts or band conveyors and belt conveyors, are mostly stationary conveyor systems that belong to the technical field of continuous conveyors.

Conveying and transport tasks in mining, in industry and on long distances, above or below ground, have been handled by belt conveyors for decades. These belt conveyors are reliable transport systems that are economical, highly productive and environmentally friendly due to their low energy consumption.

The diagnosis systems known from the prior art are concerned with methods which inspect and evaluate the rotating parts of the conveyor systems (drives, drums, idlers) or monitor the belt and its connection points.

Current self-propelled idler maintenance and diagnosis systems run on rails laid on the floor or on the belt cheek, which is part of the existing belt frame. In addition, a separate running rail can be provided when the conveyor is installed or can be retrofitted to existing conveyors.

Systems that move on rails laid on the floor, as described in EP2828183B1, have a relatively high net mass because they have to enclose the conveyor with a gantry. The installation of the running rails is an additional effort. Moving the diagnosis system on the belt cheek is only possible if this has already been taken into account during the construction of the conveyor and a continuous track has been created. The installation of a separate running rail remains as a light and inexpensive system.

Systems available on the market demonstrate weaknesses here with regard to simple dismantling during maintenance work on the conveyor and with regard to the rigidity that is required to ensure trouble-free operation of the diagnosis system.

These systems substantially consist of a vehicle that can accommodate various sensor systems and a running rail that extends along the conveyor or along the region to be monitored. Profiles such as T profiles or L profiles are common as the running rail. Along the monitoring region, segments are welded or screwed together to form a continuous travel track.

The vehicle itself can be a compact unit or, similar to a traction system, consist of a drive unit and coupled sensor units.

The sensor system comprises, for example, optical, thermal, acoustic, magnetic, mechanical, capacitive, piezoelectric, resistive and inductive sensors. If the increase in travel distance is too great (approximately from 10°, or 0.175 rad), toothed racks can be arranged to provide support at these points; it is also possible to attach additional drive units. The profiles can be arranged on both sides of the conveyor system in order to ensure monitoring of all the idlers. In order to prevent derailment, the vehicle (system) should have mechanisms such as roller guides. If necessary, the vehicle (system) can be equipped with a "roof" which is intended to provide protection from transport material. If the vehicle (system) is battery-powered, "docking stations" are provided for charging the batteries/accumulators and transmitting the data on the route.

The disadvantage of the prior art is that it is difficult to dismantle the running rail during maintenance work on the conveyor. If the work is carried out on the side of the conveyor, the rail must be removed at this point in order to achieve better accessibility of the components to be serviced and to prevent deformation of the rail during maintenance work. Depending on the length of the rail segments, numerous screws must be loosened for dismantling. During assembly, there is a great deal of effort involved in aligning the rail track.

Running rails consisting of profiles according to the prior art also have the disadvantage that they have a low level of rigidity. In order to reduce the deflection of the rail, the distances between the fastening points on the conveyor are small. External influences such as wind must be taken into account when dimensioning the rail track.

EP 3 543 179 A1 claims a method which is based on a rail consisting of a T-profile and presents a vehicle adapted therefor. The system presented describes at least two pairs of running gears that travel on this rail; the embodiments suggest a vehicle having 3 pairs of running gears, which are arranged on the connecting piece and flange of the profile opposite one another. However, the described running gear having the rail system has several design-related weaknesses. The rail and its transitions generate vibrations when vehicles pass over them, which results in additional loading for the vehicle and the rail. In practice, the profile itself has a low level of rigidity, so that deformations occur due to the running gears, which deformations in turn make it difficult to record reproducible data due to fluctuating distances from the measurement object. The vehicle and its components have a centre of gravity above the rail, which leads to high loads on the running gear when cornering or when the rail is discontinuous. When passing over a rail joint, there is a discontinuity due to weld seams or joint gaps that shake and possibly damage the measuring system; the running gear experiences additional wear and the profile is easily deformed due to the structural proximity to the conveyor. The requirement of easily removing the rail system for local maintenance and repair work on the conveyor and of mounting and aligning it again with minimal effort is not fulfilled by the described method.

It can be summarised that these points have a disadvantageous effect on trouble-free, long-term operation of the diagnosis system and make it difficult to maintain and restart the system.

Another disadvantage of the prior art is the high level of design effort needed to prevent derailment of the running gear of the diagnosis system on the profile geometry (L profile). The systems known for this purpose are prevented from derailing by gravity and being inserted "from above" into the profile geometry. A single-axis force-fit derailment safety device, without being supplemented with a form fit or multi-axis force fit, does not offer sufficient operational safety as a result of external system disturbances such as wind or route errors. This leads to considerable effort and loss of trust on the part of the user, because the system either has to be corrected regularly or does not work properly and therefore delivers incorrect results.

The object of the present invention is to overcome the disadvantages in the prior art and to facilitate the fatigue strength, maintainability, assembly and disassembly of the rail system and the vehicle. For this purpose, a track is proposed which overcomes these disadvantages, while having a high degree of rigidity; deformation caused by environmental influences or by vehicles passing over should be minimal. Another object of the present invention is to propose a running gear which, among other things, can run on the proposed rail system. The invention focuses on safe driving operation, low wear and the prevention of derailments under all operating conditions. Furthermore, the running gear is intended to be used on existing constructions and, due to its own geometry, make these constructions usable as a track for new diagnostic applications, such as guardrails on roads. Another object of the present invention is to optimise the interaction between the track and the running gear for trouble-free measurement journeys.

The object is achieved by the features of the independent claims. Advantageous embodiments are specified in the dependent claims.

According to a first aspect of the invention, a rail system is proposed as a track for suitable running gears, this rail system being formed from a closed profile or tube. Comprising at least one multi-part track holder, which is arranged on the belt frame. This rail system further comprises at least one fixing rod and at least one running rail, the fixing rod preferably being inserted into the track holder and additionally being longer than said track holder, the track holder being suitable for accommodating the running rail at at least one end by insertion, thus creating a track without cross-section differences.

The track holder is formed at least from a clamp, a connecting piece and a running-rail support or rail support. The connecting piece is not detachably connected to the clamp and the rail support. The rail support has a slot through which a fastening means is guided, which in turn is rigidly connected to the inserted fixing rod. The length of the slot is selected so as to allow the fixing rod to be displaced in the rail support so that the rod and rail support form at least one flat edge.

In embodiments of the invention, the closed profile of the rail system is designed in such a way that it is either round or has n corners, where n is at least 2 and the corners can be defined mathematically as discontinuity between the connecting lines, it being possible for these lines to be polynomials of the nth order, the profile being described by the neutral axis. The running rail therefore has a high degree of rigidity. Deformations due to environmental influences or from the vehicle passing over are minimal.

In embodiments of the invention, each running rail is connected to the belt frame on the right and left by multi-part track holders. This multi-part track holder consists of a clamp which can be positioned with at least one side flat against the profile of the belt frame.

The clamp preferably engages around the profile of the belt frame in such a way that it can only be positioned in the vertical direction.

In embodiments of the invention, the clamp is provided with openings, preferably bores, which allow it to be fastened using detachable fastening means. In a preferred design of the embodiments, the clamp has two bores.

In embodiments of the invention, the clamp of the track holder is a folded piece of flat steel.

Another component of the multi-part track holder is the connecting piece that connects the clamp to the rail support.

In embodiments of the invention, the connecting piece of the multi-part track holder is a square profile.

In embodiments of the invention, the rail support is a square profile, preferably the same profile as the running rail, thus creating that a continuous track.

In embodiments of the invention, the rail support of the track holder is oriented such that each of the upper and lower points of the rail support is formed by a corner of the profile. The upper and lower corners of the running rail and the rail support thus form the region on which the vehicle travels.

In embodiments of the invention, by using a closed profile, the rail support is able to displaceably accommodate an identically shaped profile of slightly smaller dimensions—the fixing rod—in the profile interior.

In embodiments of the invention, the fixing rod is displaceable in the interior of the rail support. A slot in the rail support and an adjusting lever attached to the fixing rod limit the displacement on both sides. The fixing rod can protrude from the rail support on one or both sides in the direction of travel. When the running rail is installed, the fixing rod engages in the running rails on both sides and is secured against displacement by a screw.

For assembly work, the fixing rod is moved into one of the extreme positions that are defined by the slot in the support and the threaded bore in the fixing rod when the adjusting lever is inserted. In both extreme positions, the fixing rod protrudes beyond the support only on one side. The running rail can now be removed.

In embodiments of the invention, the multi-part track holder can be arranged on both sides of the conveyor. It is therefore possible for a diagnosis system to pass close to the viewing position on both sides.

In embodiments of the invention, the closed profile of the rail system can be variably combined from at least two profile geometries, thus resulting in composite geometries. These geometries can be formed, for example, from a tube and a U profile, or an L profile and a U profile.

According to a further aspect of the invention, a running gear is proposed which is suitable for travelling on the rail system according to the invention. For this purpose, this running gear has at least one two-part system, which is also referred to as a guide and drive roller system in accordance with its design as a guide and drive system. The running gear also has at least one chassis that accommodates and connects the systems and has connection options for sensor-system carriers and/or the energy control module. The guide system is designed such that it encloses the geometry of the track in such a way that it limits the kinematic degrees of freedom to one and omits the holding of the track. This is preferably achieved by arranging guide elements, such as a roller, wheel or sliding element, on at least two differently oriented surfaces of a track.

The axes of the connections of the guide system are in one plane and the axes of the connections of the drive system lie in another plane that is different from that of the guide system. As a result, only one movement (forwards/backwards) along the track/running rail is provided. The drive system is designed to move the chassis and all the connected systems with respect to the track. For this purpose, the chassis comprises connections which are suitable for accommodating sensor-system carriers and/or an energy control module(s) and for positioning these around a track/running rail on the chassis in such a way that the overall centre of gravity of the idler diagnosis system is centred below the track and the geometric central axis thereof.

The overall centre of gravity of the vehicle should have no offset or only a slight horizontal offset with respect to the running rail. A position of the centre of gravity of the vehicle above the rail is therefore neither necessary nor favourable.

Figure 7:
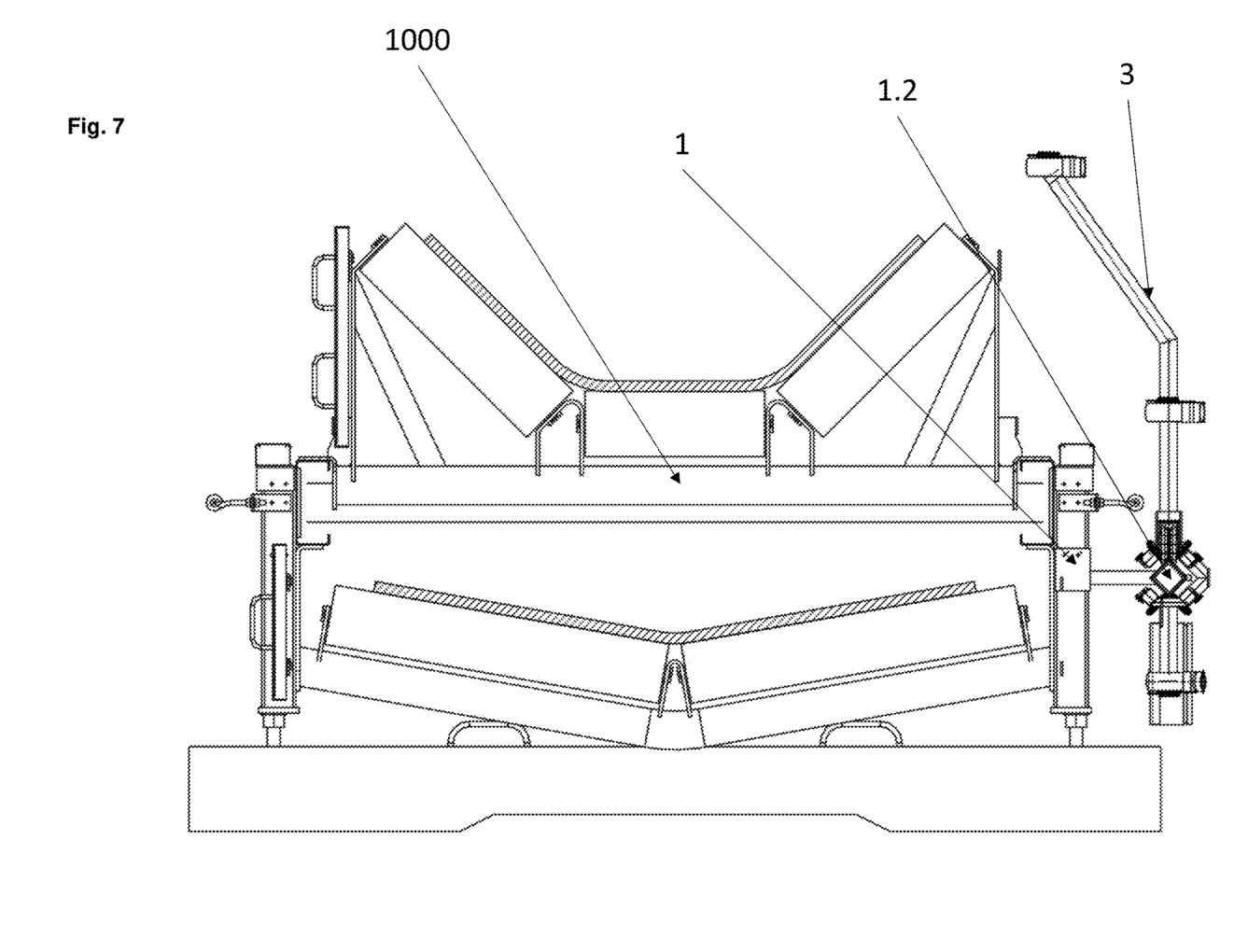
FIG. 7 is a schematic representation of a track holder with a running gear on a conveyor in a sectional view in the track direction.

As FIG. 7 shows, the centre of gravity of the vehicle can be placed below the track due to the selective arrangement of heavy components, such as the energy control module(s). This stabilises the driving system.

The chassis connections for all the systems that can be connected are positioned in such a way that the overall centre of gravity is centred below the track, in order to enable almost symmetrical loading of the guide system and the track.

This embodiment influences the travel of the travel system with regard to vibrations due to the asymmetrical centre of gravity and reduces maintenance due to less wear. Furthermore, the load on the track is reduced, which promotes its service life.

The connection options for sensor-system carriers are provided in various embodiments, such as protruding over the inspection object, for example with a framework that extends over a conveyor in order to inspect the conveyor belt. Furthermore, connection options can be provided so as to be directed downwards, i.e. under the chassis, and can also be arranged in front of and behind, as well as close to, the chassis sensor-system carrier. The energy control module(s) is/are to be arranged oriented thereto, preferably below the track and the chassis, and therefore the overall centre of gravity can be positioned optimally as described above.

In comparison with the prior art, this solution enables a reduction in the number of guide elements while at the same time restricting the degree of freedom and improving the maintainability of the running gear. The separate arrangement of the guide and drive system allows a simple and robust construction with the possibility of varying the two systems in their respective designs or combining several designs. The guide system is designed such that the individual elements are arranged symmetrically along the longitudinal axis and are spaced around the rail system in the longitudinal axis, i.e. offset. This saves elements in the guide system; the degrees of freedom remain limited by the longitudinal connection across the chassis.

In the context of the present application, the longitudinal axis is to be understood as the axis in which the running gear extends on the rail system or in the direction of travel. The transverse axis is oriented at right angles to the longitudinal axis in the same plane and the height axis is perpendicular to this plane and the axes located therein.

In embodiments of the invention, the chassis is provided with hinges that allow tight radii for cornering or abrupt steep climbs without bracing the guide system against the track.

This embodiment thus allows the arrangement of, for example, a hinge between two guide element planes; for this purpose, the hinges can allow compensation or inclination directed towards one another in the height axis, the transverse axis and to a minimal extent in the longitudinal axis. It is therefore possible to drive over greater gradients/inclines of tracks or narrower cornering, or damping of accelerations is possible. A combination of several hinges/compensation elements can also be implemented.

In embodiments of the invention, the chassis is designed such that it almost completely encloses the track, in order to allow travel over the multi-part track holder.

The running gear is intended to encompass a rail/rail system and not to protrude into same. This means that the force vectors/moment reference points of the running gear are at the same distance from a centre point, which ensures low stress and wear.

In embodiments of the invention, the guide system is provided with rollers, which are preferably arranged in pairs and are arranged in at least two opposite positions of the track.

In embodiments of the invention, the rollers of the guide system are arranged such that they rest on at least four points or lines of the track. The rollers are expediently to be arranged symmetrically on the track and do not extend in the same plane, with these roller pairs being arranged symmetrically at the same spacing/radius from the rail centre point or the track central axis, preferably on a circle around the rail centre point or the track central axis.

This design enables a stable travel position using only a few components; the four-point or line supports preferably prevent derailing on the rail system according to the invention or a comparable rail system. In addition, the force is applied symmetrically to the rail and within the vehicle. This has a positive effect on wear and service life, as well as the measurement journey.

In embodiments of the invention, the rollers of the guide system are variable in diameter; the diameter is preferably selected so that passing over rail joints does not cause any vibrations. The measuring system is thus unaffected by these joints.

In embodiments of the invention, the drive system is preferably formed of rollers and each of the rollers is designed to perform dual line contact, double line contact and/or two-line contact on the track.

This design offers the advantage that the force per roller or wheel is transmitted more effectively due to a greater contact area; this contact area is conducive to smooth and quiet travel, which in turn improves the sensor data because the measuring errors are reduced. This design is suitable in particular for conditions in opencast mining and transporting bulk goods, since the forces acting here during transport of ore, coal and the like cause shocks and vibrations in the track, which, in the previously known systems, have a detrimental effect on fatigue strength, driving stability and measurements.

In embodiments of the invention, the drive system has at least one drive unit, such as hub-driven wheels or toothed wheels.

These drive units can be combined within the drive system, for example to drive on certain rail portions, although the actual primary drive unit is not intended for this.

In embodiments of the invention, the rollers of the guide system are provided with coatings and/or special surface structures that change the coefficient of friction. In this way, for example, terrain gradients without additional drive systems or cornering with cant are possible, of the travel system remaining directionally stable.

In embodiments of the invention, the drive system is to be positioned so far up on the track by the position in the chassis that it is held in engagement by gravity.

As a result of this arrangement above and on the track and the force of gravity to keep the drive system engaged, the material is protected. In the event of disturbances on the track, the drive system cannot be damaged, but is lifted out of contact. As a result of lifting, there is no drive for a short time, but due to the inertia of the system it overrides the fault and then engages again due to gravity and drives again. This lifting is also carried out in the event of gradient transitions in the track, thus reducing the load and fault sources.

In embodiments of the invention, the drive system is supplemented with a resilient mechanism, so that the drive still remains in contact for a short time or is not damaged due to discontinuities in the track.

The resilient mechanism acts like a damper and/or a spring and prevents the drive system from oscillating on the track as a result of discontinuities. Furthermore, it can bring about a permanent restoring force which keeps the drive system in engagement when a gear drive is used, thus preventing wear as a result of permanently incorrect engagement normals.

In embodiments of the invention, a combination of a guide system or a drive system with the other system in each case is possible.

This variant is a kind of special form or hybrid which is used for track geometries that cause a structural collision of the systems. In these cases, the guide system can take on drive tasks or the drive system can take on guide tasks. For example, in the case of triangular geometries in which an encompassing wheel with a flange is used on the corner(s), which, among other things, drives on one upper corner, an additional drive system would not be feasible due to a lack of space.

In embodiments of the invention, receptacles for the sensor system can be provided at almost any position on the chassis.

Depending on the requirements of the sensor system, for example, an overhanging arm can be attached in such a way that it can be used to look at the belt of a conveyor from above, or downwards to be able to inspect the free belt for damage. It is also conceivable to attach identical sensors to the chassis at the front and rear in order to provide a redundant measuring system with error correction. The chassis receptacles can therefore be adapted to the application requirements in principle and are not limited to an upper position.

In embodiments of the invention, the receptacle positions of the sensor system on the chassis are arranged in such a way that the sensors detect the rollers and/or the belt and/or bearings. For example, in the case of belt conveyors, the receptacle positions for the sensor system on the chassis can be selected such that the sensors can be aligned from above towards the belt, from the side towards the rollers and their bearings, and from below towards drives or belts. The sensors are preferably arranged in such a way that they have a defined/favourable angle with respect to the object being viewed.

In embodiments of the invention, the energy control module is preferably arranged under the track on the chassis. This position enables better compensation for the overall centre of gravity if the sensor system protrudes to a great extent upwards and/or to the side. Due to the higher net mass of this module, it is favourable for the driving characteristics if it is arranged to be low.

The preferred low position also has a positive effect on the driving characteristics, because the downward-directed inertia of the vehicle reduces jumping as a result of discontinuities or disturbances and thus increases driving stability.

In embodiments of the invention, the energy control module is also to be provided in a divisible manner in order to make the net mass and/or the use of installation space uniform around the track in the case of a structurally limited application.

In the case of longer chassis with overhanging measuring systems or chassis coupled multiple times, this division is recommended because the masses can be distributed and the system as a whole puts an almost constant and lower load on the track. In this way, tracks that appear unsuitable for large and heavy driving systems can be assessed as suitable due to the linear distribution and point load reduction.

The invention will be explained in greater detail in the following with reference to some embodiments and accompanying drawings. The embodiments are intended to describe the invention without limiting it. In the drawings:

FIG. 1 is a schematic representation of the track holder (1) according to the invention in a three-dimensional view. This shows a possible design of a track holder with its base elements. Here, the track holder (1) consists of the clamp (10), the connecting piece (11), the rail support (13) and the slots (15) provided thereon, together with the movement fixing means of the fixing rod (14). The structure shown here can be mounted on conveyors by means of an opening (12) and the screws shown here. The clamp (10) is designed as a folded piece of flat steel in order to engage around the conveyor; the connecting piece (11) is designed as a piece of square steel, as well as the track support (13).

Figure 1:
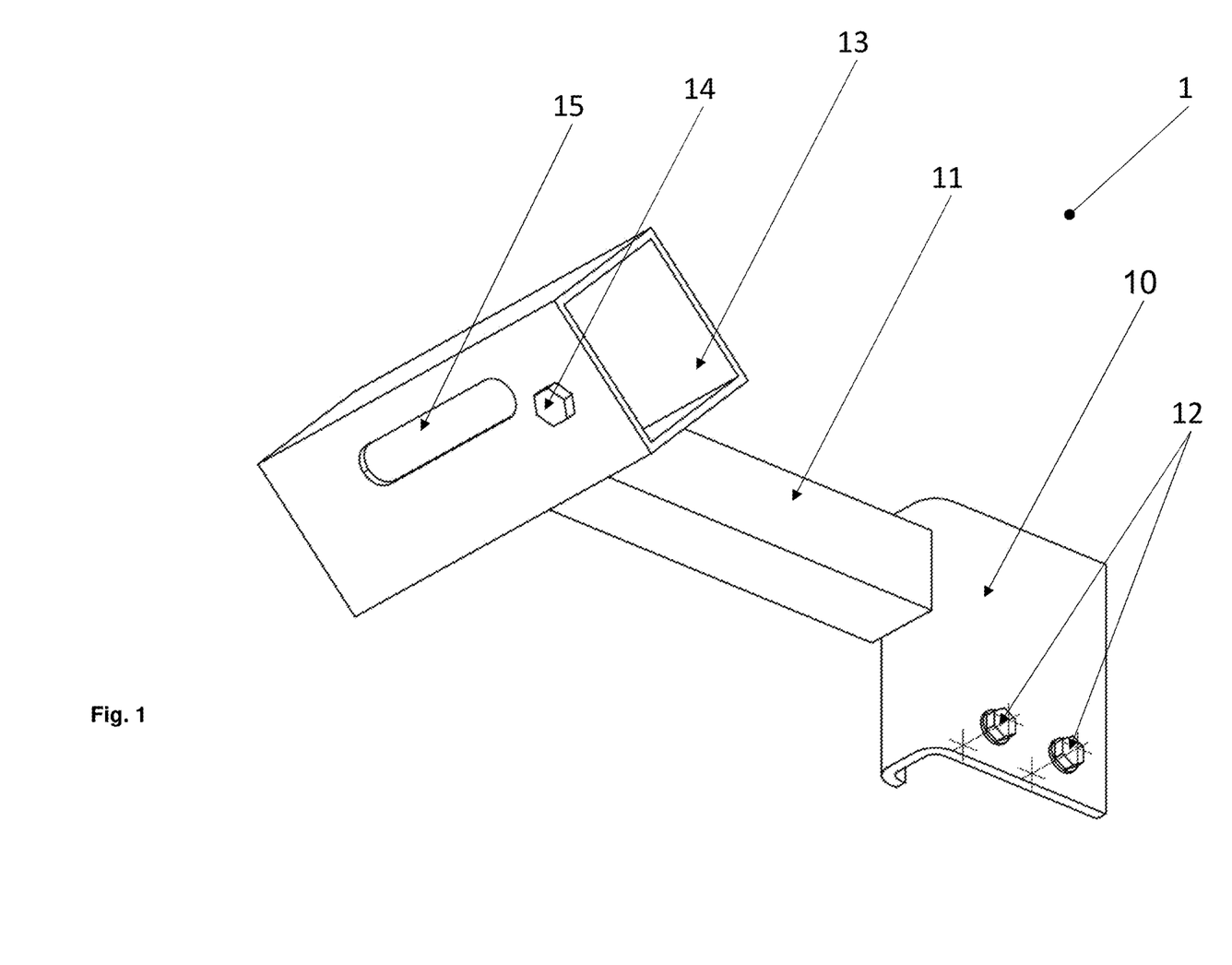
FIG. 1 is a schematic representation of a track holder, as a base, in a three-dimensional view.
Figure 2:
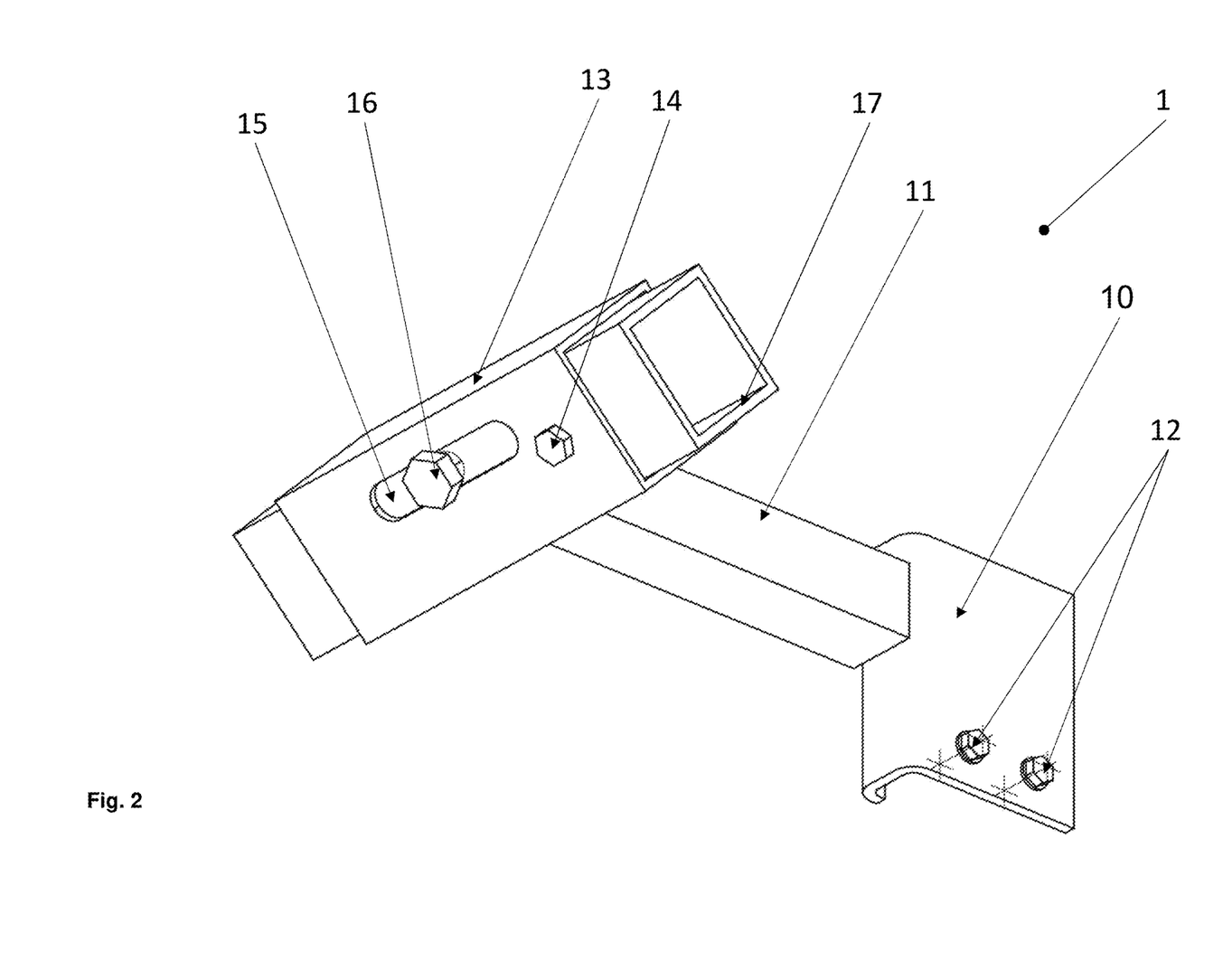
FIG. 2 is a schematic representation of a track holder, as a base with pre-mounted elements, in a three-dimensional view.

In a further embodiment, FIG. 2 is a three-dimensional view comprising the mounted track holder (1). This shows a possible design of the track holder (1) consisting of a bent clamp (10) having two openings (12), here with a stylised hexagon screw head, for attachment to a conveyor. The connecting piece (11) and the rail support (13) are also shown. A slot (15) with an adjusting lever (16) and a movement fixing means (14) can be seen in the rail support (13), and the fixing rod (17) is also inserted in the rail support (13). This fixing rod has the same geometry but with smaller dimensions in order to be movable in the rail support along the slot. In this example, the fixing rod (17) can be seen near its central position. In this position it fixes the running rails. A self-movement of the fixing rod impedes the movement fixing means (14), and the adjusting lever (16), in combination with the slot (15), limits the adjustment range of the fixing rod (17) with respect to the rail support (13).

Figure 3:
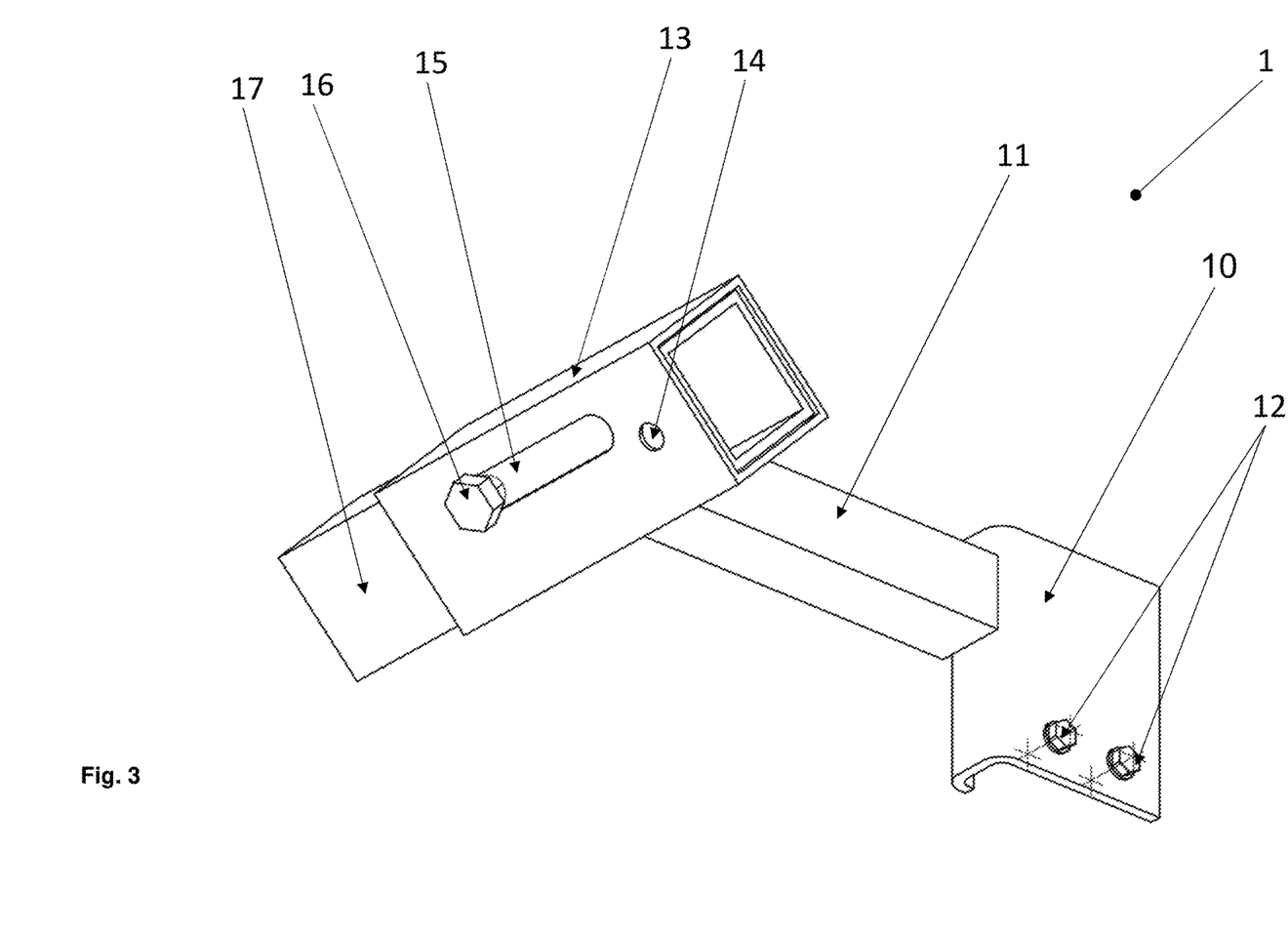
FIG. 3 is a schematic representation of a track holder, with a fixing rod in an end position, in a three-dimensional view.

In a further embodiment, FIG. 3 is a three-dimensional view of a mounted track holder (1). This shows the fixing rod (17) in an end position of the adjusting lever (16) within the slot (15) and with the movement fixing means (14) released. This position is to be selected for the assembly and disassembly of the rail system; it can be seen here that the left side of the track holder fixes the running rail, while the right side of the track holder is loose.

Figure 4:
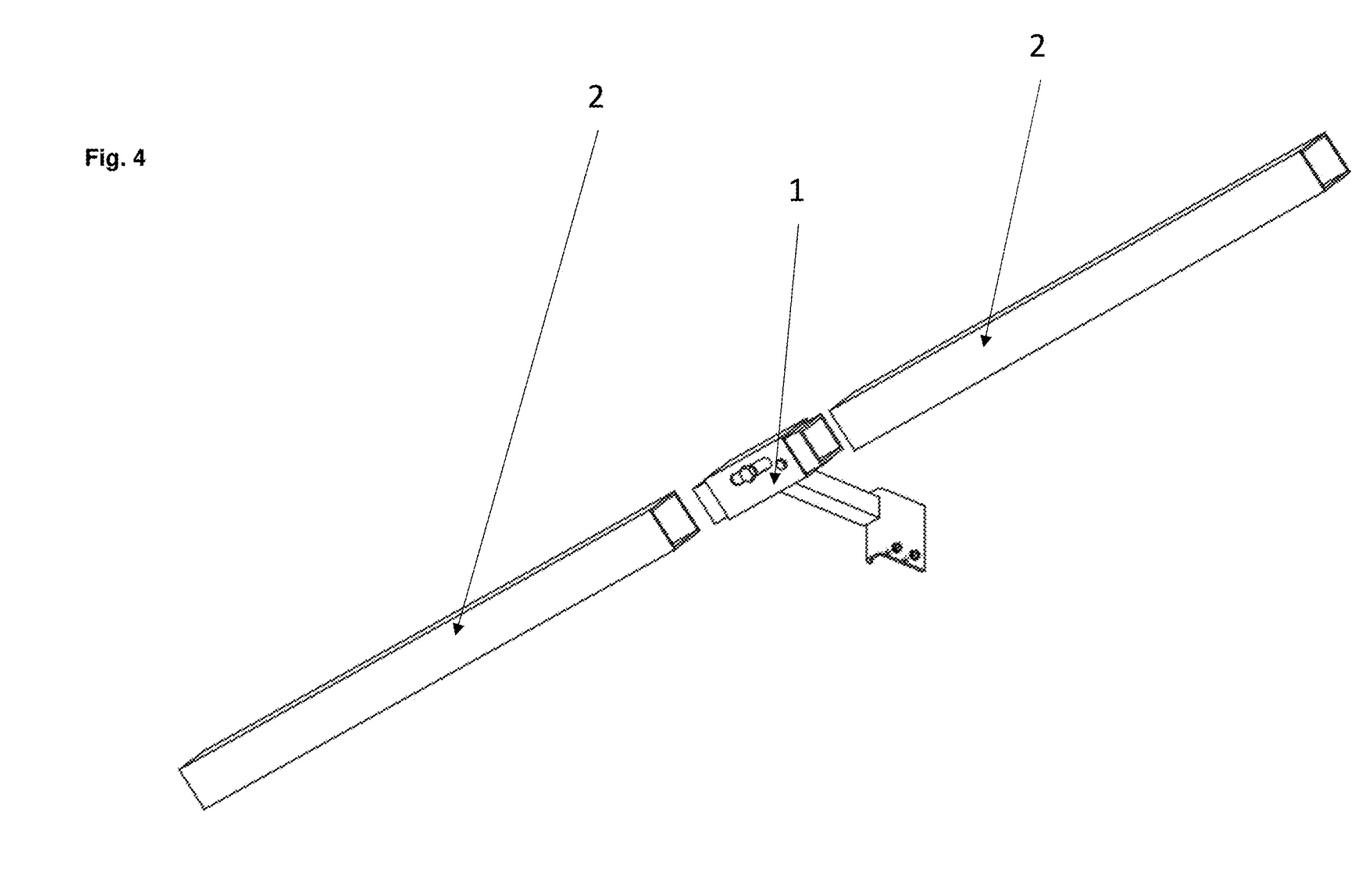
FIG. 4 is a schematic representation of a track holder, with two running rails, in a three-dimensional view.

In a further embodiment, FIG. 4 is a three-dimensional view of a track holder (1) with two running rails (2). This view has been selected as an exploded view; it is intended to show that the rail support of the track holder has the same cross-section as that of the running rails (2), for trouble-free passage of suitable diagnosis systems. Furthermore, a central position of the fixing rod can be seen, so that the rail systems are flush with the rail support and are held in their position by same.

Figure 5:
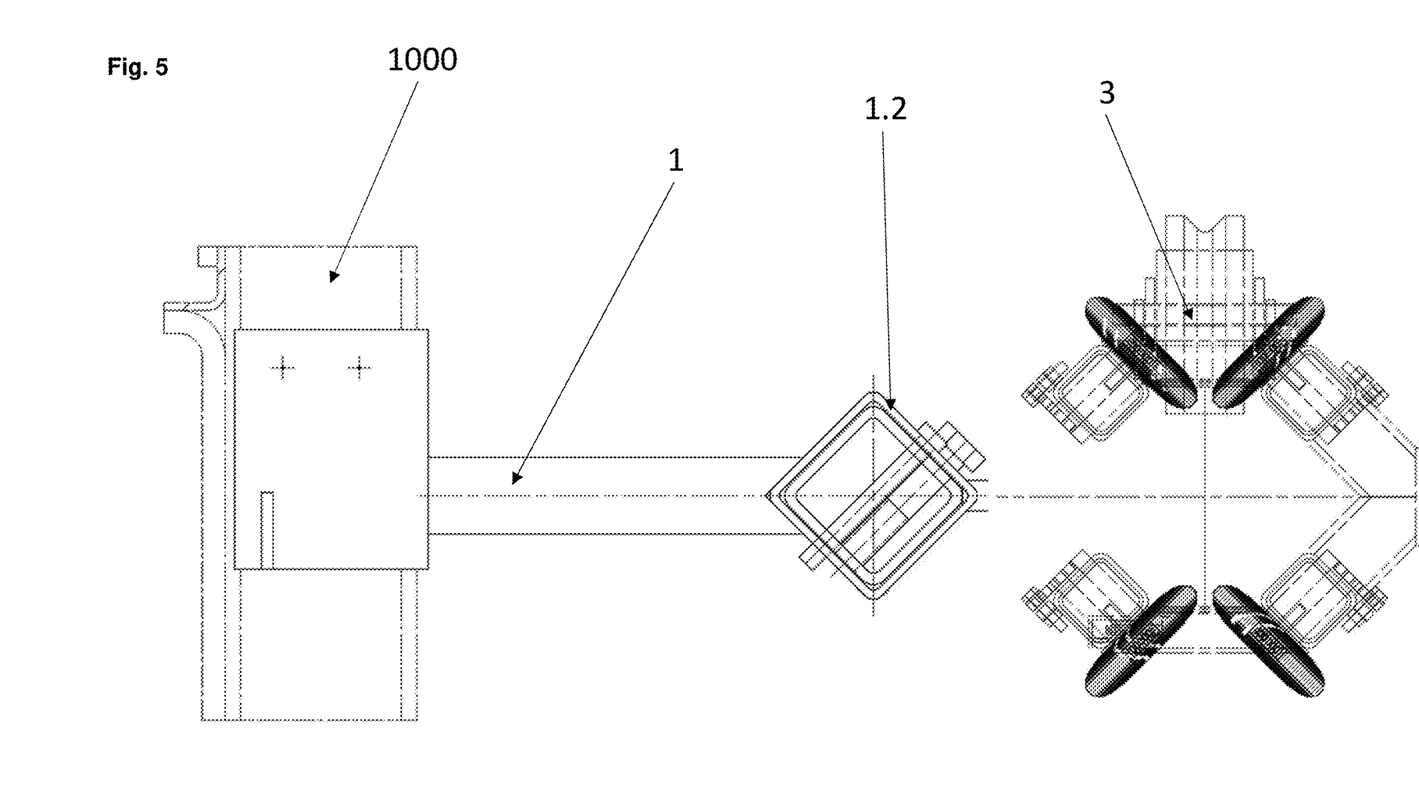
FIG. 5 is a schematic representation of a track holder, a running rail and a running gear shown separately in a sectional view in the track direction.

In a further embodiment, FIG. 5 is a sectional view in the track direction; this shows a track holder (1) connected to a conveyor (1000) with a running rail (2), as well as a separate running gear (3) in parallel. The running gear (3) is a detailed view that is intended to show the arrangement of the rollers with respect to the geometry of the track. The guide rollers shown here are arranged in pairs at the top and bottom of the running rail (2) and each travel on a surface of the rail system. Furthermore, an opening can be seen on the left in the running gear (3), which opening is used for passing over the track holder (1) and the connecting pieces thereof.

Figure 6:
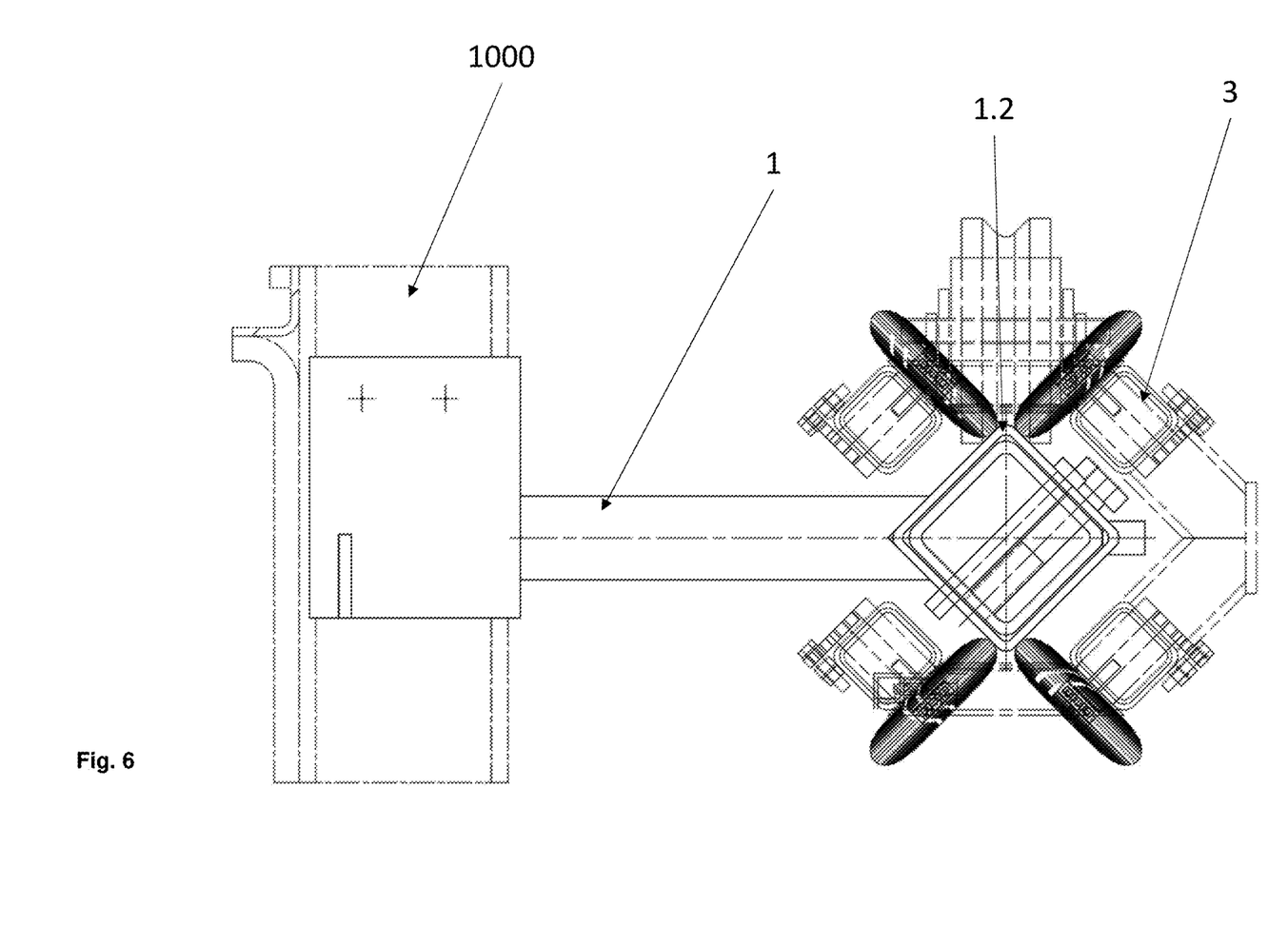
FIG. 6 is a schematic representation of a track holder, a running rail and a rerailed running gear in a sectional view in the track direction.

In a further embodiment, FIG. 6 is a sectional view of the track holder (1), the running rail (2), a section of the conveyor (1000) and the running gear (3). In this view, the running gear (3) is rerailed on the running rail (2) of the rail system, which makes it clear in which regions of the rail system the rollers run and that the running gear geometry passes over the discontinuities in the region of the track holder without promoting derailment.

In a further embodiment, FIG. 7 is a sectional view in the track direction. This shows a conveyor (1000) to which a track holder (1) with a running rail (2) of the rail system, and a running gear (3) with possible diagnosis systems travelling thereon. This view should show where the tracks are preferably mounted on the conveyor. It can also be seen that the diagnosis systems can diagnose the entire height of the conveyor due to the running gear geometry and the track without the risk of derailment.

Figure 8:
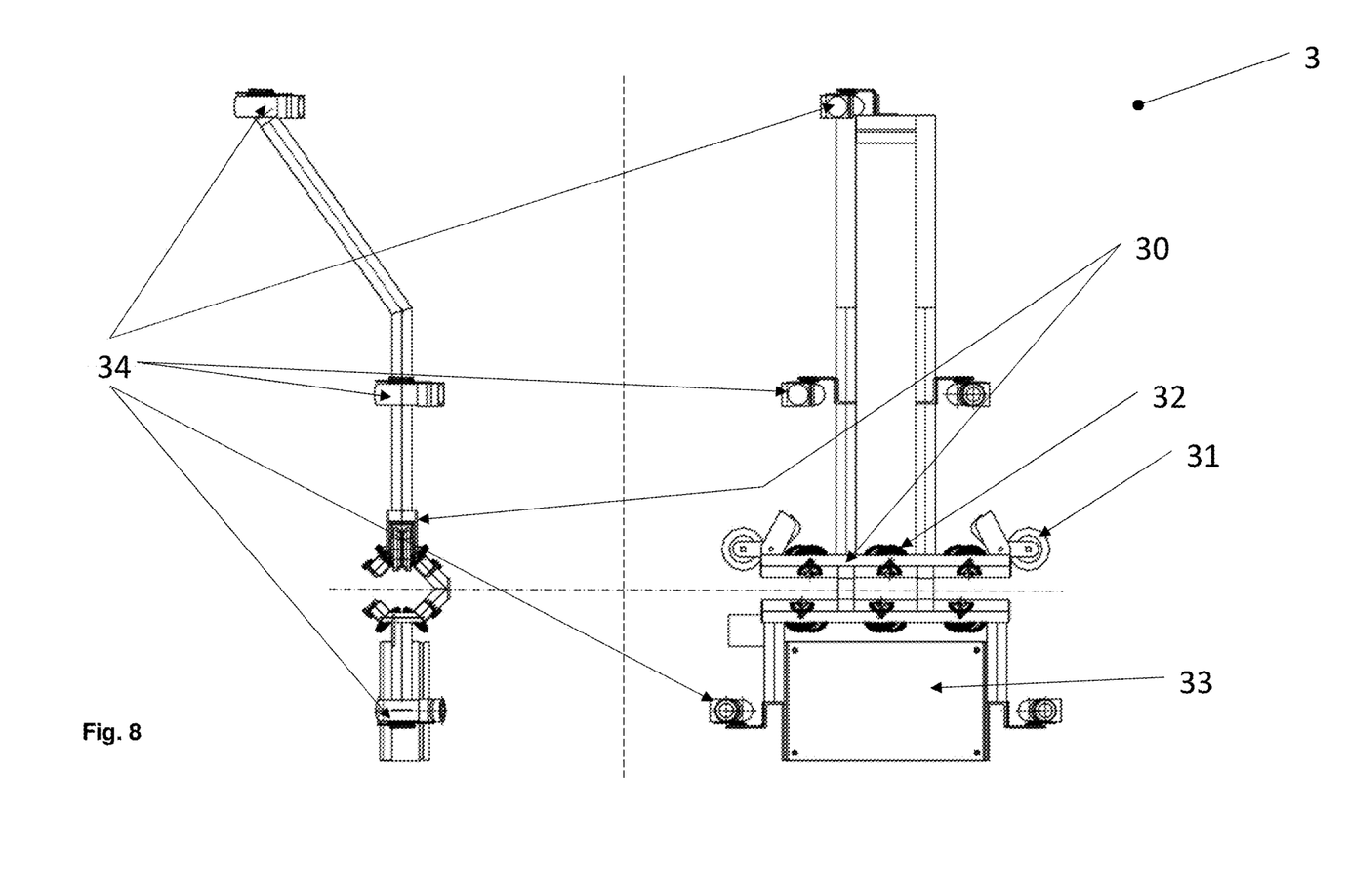
FIG. 8 is a schematic representation of a running gear with connected systems in a side and sectional view in the track direction and FIG. 9 is a schematic representation of a running gear on a rail system with track holders in a three-dimensional view.

In a further embodiment, a running gear (3) is shown in two views in FIG. 8. The chassis (30) serves as the base for all the elements, to which chassis guide systems (32) and drive systems (31) are connected. Here, these systems are designed as rollers that are provided with hub motors, for example. Furthermore, the energy control module (33) is arranged below the roller systems (31, 32); it ensures the energy supply via accumulators and processes the control commands, which can be available as a routine or via radio. The sensor system with the receptacle positions (34) can also be seen; these positions shown here enable the inspection of idlers and their bearings in several planes (upper and lower belt) and a view from above of the belt or the goods to be transported. For this purpose, a type of telescopic frame is connected above the roller systems (31, 32).

Figure 9:
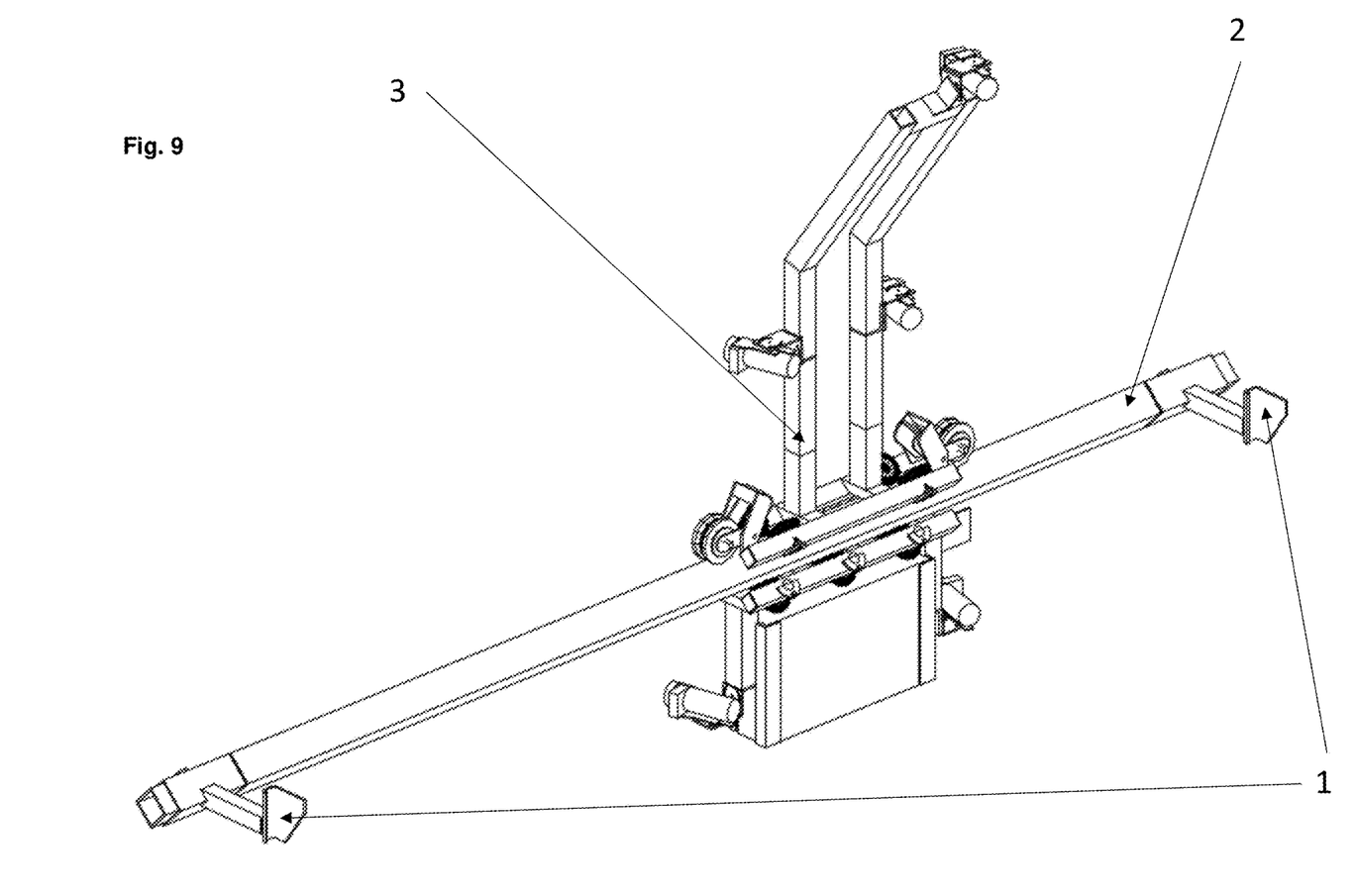

In a further embodiment, the interaction of all the components is shown in a spatial view in FIG. 9. For this purpose, there are two track holders (1), a running rail (2) therebetween and a running gear (3) having various systems, such as sensors, rollers, carriers and an energy control module, on the track. This can be seen from a conveyor (not shown) obliquely from behind. As a result, the opening in the chassis of the running gear is visible, which opening makes it possible to pass over the track holder.

Figure 10:
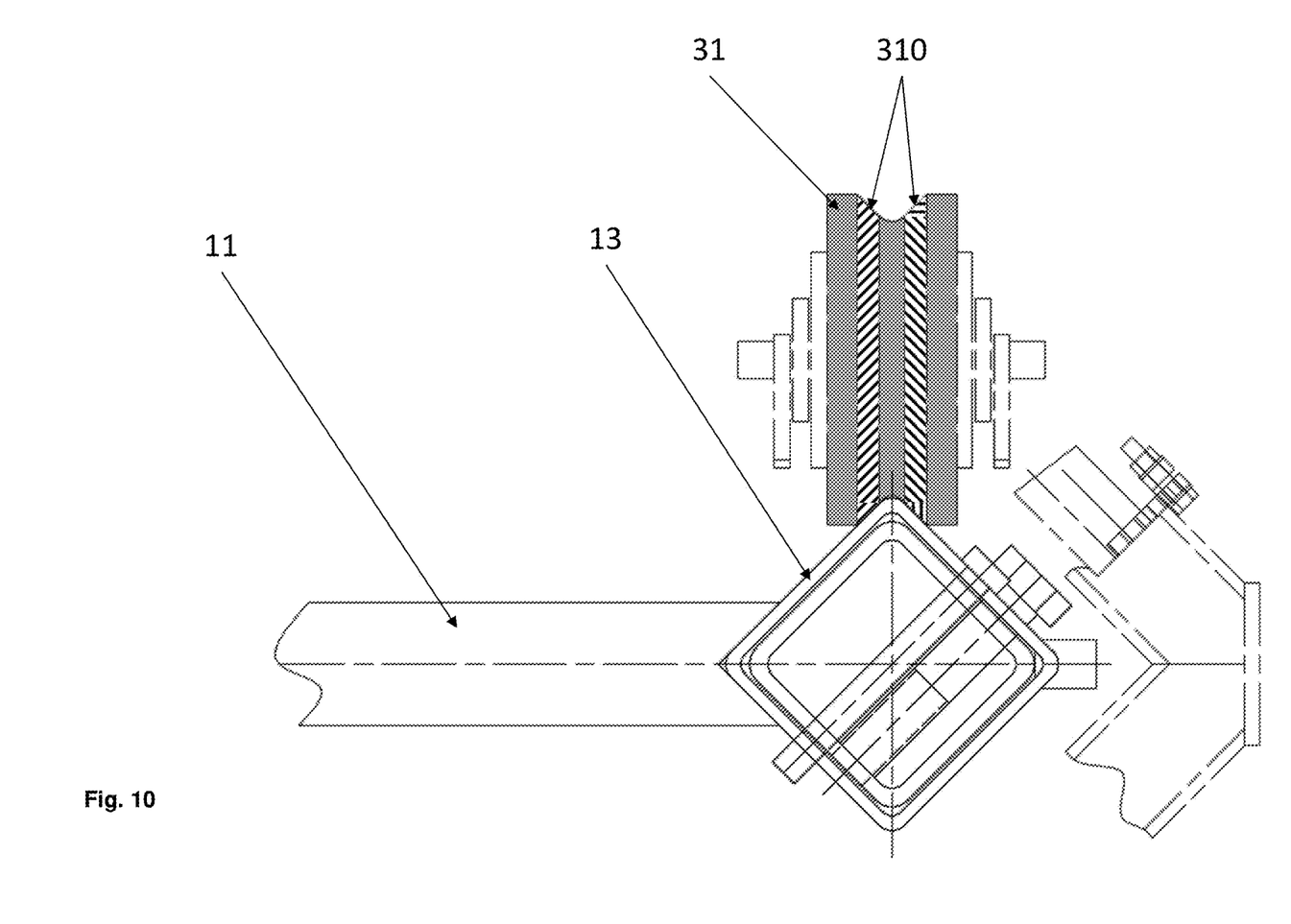
FIG. 10 is a schematic representation of a running gear and its contacts with respect to the rail system with a track holder section in a sectional view In a first embodiment.

In a further embodiment, FIG. 10 shows a running gear section in a sectional view. This shows a connecting piece (11), a rail support (13) and the components connected thereto as seen in a direction of travel. A running gear section is shown through a roller of the roller system (31) on the rail support (13). This roller has two hatched regions which illustrate the dual line contact, the double line contact or the two-line contact. The geometry of the rollers is selected such that they travel over the corners of the rail support (13) without coming into contact therewith. This has the advantage, inter alia, that the roller has more contact/engagement surfaces and thus improves force transmission, which results in smooth travel behaviour. This lateral guide/drive surface stabilises the drive system on the rail so that it always has at least one contact.

LIST OF REFERENCE SIGNS

1 Track holder, multi-part
2 Running rail, rail system
3 Running gear
10 Clamp
11 Connecting piece
12 Opening, fastening element, clamp
13 Travel/rail support
14 Opening, movement fixing means, fixing rod
15 Slot
16 Adjusting lever
17 Fixing rod
30 Chassis
31 Drive roller system, drive system
310 Dual line contact, double line contact, two-line contact
32 Guide roller system, guide system
33 Energy control module
34 Sensor system, receptacle positions
1000 Conveyor

The invention claimed is:

1. An idler diagnosis system on conveyors, comprising:
at least one running rail, which is designed as a closed profile,
at least one multi-part track holder, which is designed to arrange the running rail on a belt frame of the conveyor, wherein the track holder comprises a running-rail support which is designed as a closed profile, and
at least one fixing rod, which is movably arranged inside the running-rail support, wherein the fixing rod is designed as a closed profile and is designed to receive the running rail at least at one end,
wherein the closed profile of the railing system is designed in such a way that it has n corners, where n is at least three and the corners are defined mathematically as discontinuity between connecting lines, it being possible for these lines to be polynomials of $n^{th}$ order, the profile being described by a neutral axis, and
wherein the rail support of the track holder is oriented such that each of upper and lower pointes of the rail support is formed by a corner of the profile.

2. The idler diagnosis system according to claim 1, wherein the track holder has a clamp for arrangement on the belt frame of the conveyor.

3. The idler diagnosis system according to claim 2, wherein the clamp engages around the belt frame in such a way that positioning on the belt frame takes place in the vertical direction.

4. The idler diagnosis system according to claim 3, wherein the rail support of the track holder has an opening for fixing the position of the fixing rod.

5. The idler diagnosis system according to claim 4, wherein the rail support of the track holder has a slot that is designed such that a fastening means is rigidly connected to the fixing rod through the slot, so that the fixing rod can be moved captively within the rail support, the fixing rod forming at least one flat edge.

6. The idler diagnosis system according to claim 5, wherein the closed profile of the rail system is designed in such a way that it has n corners, where n is at least 2 and the corners are defined mathematically as discontinuity between connecting lines, it being possible for these lines to be polynomials of the $n^{th}$ order, the profile being described by a neutral axis.

7. The idler diagnosis system according to claim 1, wherein the rail support of the track holder has an opening for fixing the position of the fixing rod.

8. The idler diagnosis system according to claim 1, wherein the rail support of the track holder has a slot that is designed such that a fastening means is rigidly connected to the fixing rod through the slot, so that the fixing rod can be moved captively within the rail support, the fixing rod forming at least one flat edge.

9. The idler diagnosis system according to claim 1, wherein the rail support of the track holder has an opening which is suitable for allowing the fixing rod to be fixed in position with respect to the rail support and thus to prevent unintentional displacement of the fixing rod.

10. An idler diagnosis system on tracks, by means of a running gear comprising:
at least one two-roller system, wherein this system is designed as a guide and drive system,
at least one chassis, wherein this accommodates and connects the two roller systems, wherein the chassis has connections which are suitable for accommodating sensor-system carriers and/or an energy control module(s) and for positioning these two-roller systems around a track on the chassis in such a way that the overall centre of gravity of the idler diagnosis system is centred below the track and a geometric central axis thereof, wherein
receptacle positions of the sensor system are arranged on the chassis in such a way that the sensors detect rollers and/or the belt and/or bearings.

11. The idler diagnosis system according to claim 10, wherein connection options for sensor-system carriers can be arranged so as to protrude over an inspection object, and directed downwards, in front of and behind, as well as close to, the chassis, the energy control module(s) being intended to be arranged oriented thereto, preferably below the track and the chassis.

12. The idler diagnosis system according to claim 10, wherein the guide system is designed to enclose a geometry of the track in order to limit kinematic degrees of freedom to one, without the holding of the track if necessary.

13. The idler diagnosis system according to claim 10, wherein the drive system is designed to move the chassis and all the connected systems with respect to the track.

14. The idler diagnosis system according to claim 10, wherein the drive system is formed of rollers and each of the rollers is designed to perform dual line contact, double line contact and/or two-line contact on the track.

15. The idler diagnosis system according to claim 10, wherein the guide system preferably has rollers arranged in pairs, these rollers being arranged in at least two opposite positions of the track, these roller pairs being arranged symmetrically at the same spacing/radius from a rail center point or a track central axis, preferably on a circle around rail center point or the track central axis.

16. The idler diagnosis system according to claim 10, wherein the rollers of the guide system are arranged symmetrically on the track and do not extend in a same plane, these rollers resting on at least four points or lines of the track.

17. The idler diagnosis system according to claim 10, wherein the drive system is positioned so far up on the track by the position in the chassis that it is held in engagement by gravity.

* * * * *